Sept. 19, 1933. H. E. DYCHE Re. 18,956

CAMERA OPERATING MECHANISM

Original Filed June 16, 1926 3 Sheets-Sheet 1

INVENTOR
Howard E. Dyche
by his attorneys
Byrne, Stubblefield
& Parmelee

Sept. 19, 1933. H. E. DYCHE Re. 18,956

CAMERA OPERATING MECHANISM

Original Filed June 16, 1926 3 Sheets-Sheet 2

INVENTOR

Howard E. Dyche by his attorneys

Byrnes, Stebbins & Parmele

Sept. 19, 1933. H. E. DYCHE Re. 18,956

CAMERA OPERATING MECHANISM

Original Filed June 16, 1926 3 Sheets-Sheet 3

INVENTOR
Howard E. Dyche
by his attorneys
Byrnes, Stebbins & Pennela

Reissued Sept. 19, 1933

Re. 18,956

UNITED STATES PATENT OFFICE 18,956

CAMERA OPERATING MECHANISM

Howard E. Dyche, Pittsburgh, Pa.

Original No. 1,824,469, dated September 22, 1931, Serial No. 116,344, June 16, 1926. Application for reissue August 9, 1933. Serial No. 684,439

15 Claims. (Cl. 234—1.5)

The present invention relates to camera operating mechanisms, and more particularly to mechanisms for the remote control of cameras utilizing moving film.

The selecting and recording of a particular group of light rays from a continuous series of rapidly changing light phenomena is attended with difficulties when attempted by manually controlled cameras. This is particularly true when the manifestation it is desired to record is of very short duration, as in the case of oscillograms. With the manually controlled apparatus, the operator must use his judgment in starting and stopping the recording mechanism, and it is not unusual for him to entirely miss the particular phenomenon he desires to record.

As an example of the difficulties encountered, let us take the case of the determination of the fluctuations in voltage or current which attend the operation of a circuit breaker. In a case of this kind the electrical fluctuations are extremely rapid and are of short duration. By means of an oscillograph, the electrical phenomena are recorded as variations in the amplitude of oscillations of a light beam. The light beam is recorded on a rapidly moving strip of film. It will be readily understood, therefore, that the instants of starting and stopping the film are important, in that a late exposure uses too much film and may miss the information desired. An early exposure will also miss the information desired. Inasmuch as a limited length of film is provided in the daylight loading film cartridges now in use, it is desirable to conserve the film in the recording mechanism.

I provide an electrically-controlled camera operating mechanism which starts the recording film moving at the beginning of the phenomenon it is desired to record, and stops the film when a predetermined film length has passed. Further advantages of my invention lie in the synchronizing of the opening and closing of the shutter with the starting and stopping of the film.

In the accompanying drawings there are shown, for purposes of illustration only, the present preferred embodiment of my invention, in which—

Figure 1:
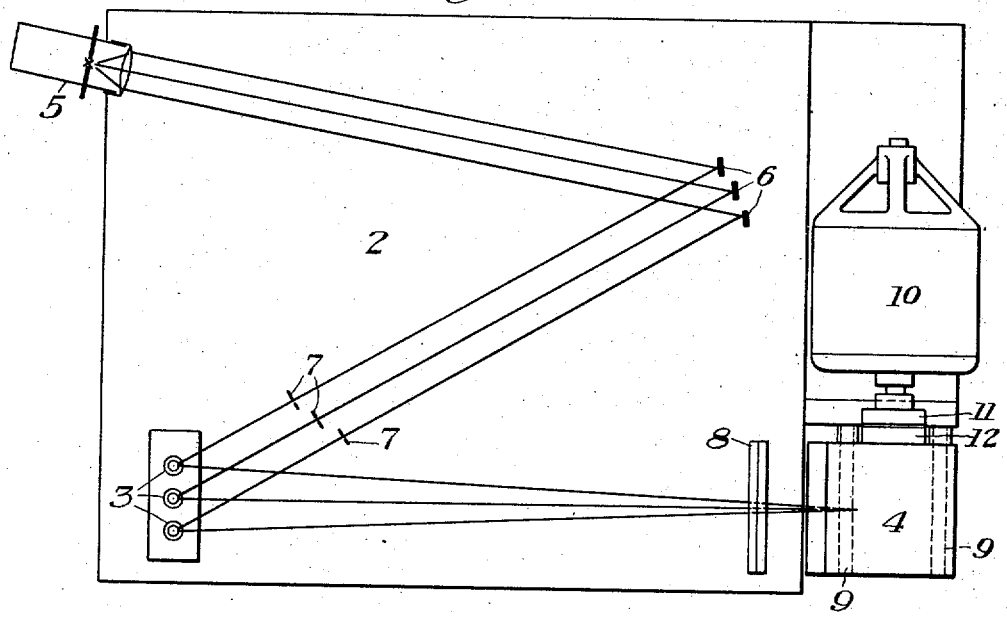
Figure 1 is a diagrammatic view of an ordinary Duddell oscillograph embodying my invention.

Referring to Figure 1, there is shown diagrammatically an oscillograph comprising a light tight box 2 containing three oscillograph elements 3, preferably of the Duddell type.

The Duddell oscillograph is well understood in this art and need not be described in detail. An oscillograph vibrator consists essentially of a single turn of fine wire, preferably flattened, held under tension, and disposed side by side between the pole pieces of a magnet. A small mirror is secured to the loop of wire. A small portion of the current whose alternations or oscillations are to be recorded is passed through the wire loop, whereby the mirror is turned, the mirror movements following the momentary current values. A beam of light is reflected from the mirror to a recording moving film upon which the displacement of the light beam is recorded as a wave outline which corresponds to the electric current waves.

The camera containing the moving film is indicated at 4. Illumination for recording purposes is provided by a suitable light source 5, such as an arc lamp or high power incandescent lamp whose light is reflected upon the mirrors of the oscillograph elements 3 by mirrors 6, undesirable light being cut off by adjustable screens 7. The light beams reflected from the mirrors of the oscillograph elements 3 are preferably concentrated by a cylindrical lens 8.

The camera 4 is mounted upon guides 9 fixed into the body portion 2. This construction makes the camera 4 readily removable for loading, or other purpose, without disturbing the remainder of the oscillograph mechanism.

Adjacent the camera 4, and fixed to the body portion 2, is a motor 10 for moving the film in the camera 4. Connection between the motor 10 and the camera 4 is effected by means of a clutch having engaging disks 11 and 12. The clutch disk 11 is continuously driven by the motor 10, which is preferably of an adjustable speed type, so that any speed of film movement required may be obtained.

Figure 3:
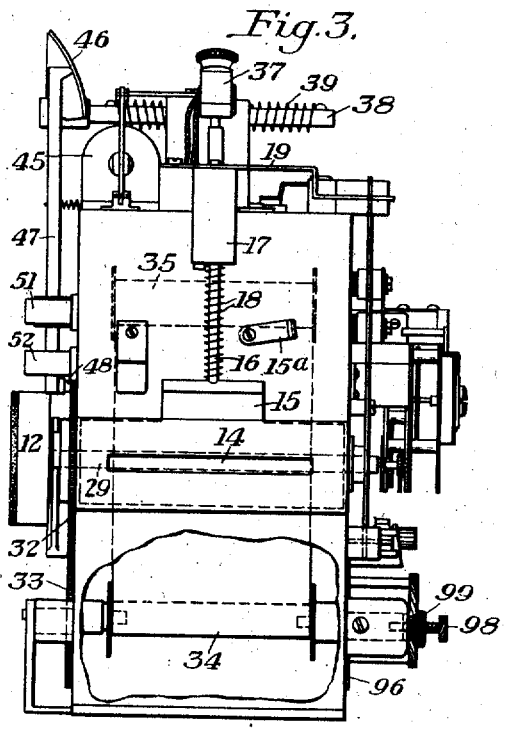
Figure 3 is a front elevation of a camera embodying my invention.
Figure 4:
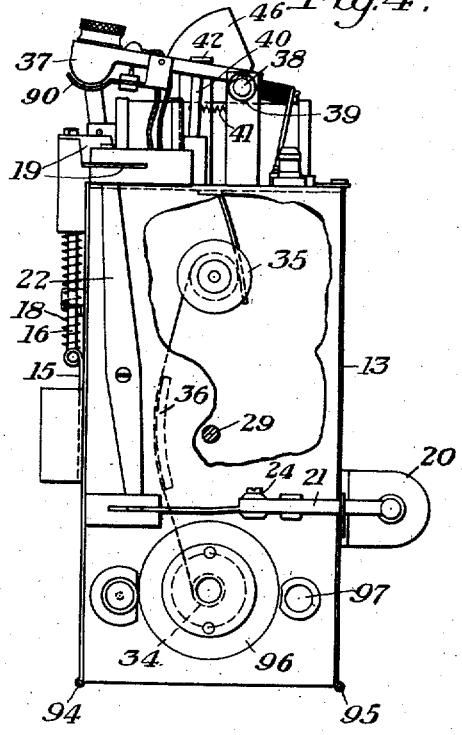
Figures 4 and 5 are right and left side elevations respectively of the camera illustrated in Figure 1.
Figure 5:
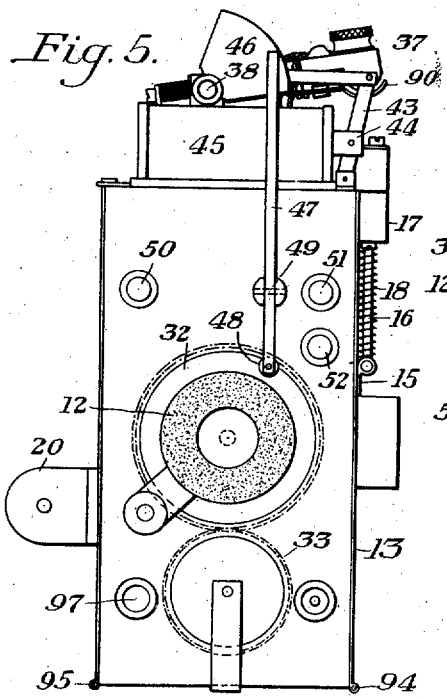
Figure 6:
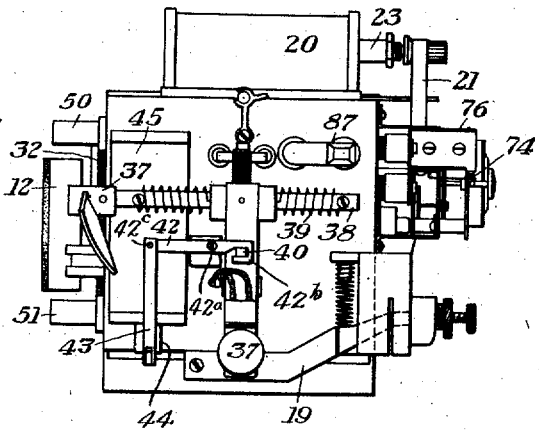
Figure 6 is a top plan view of the same mechanism.
Figure 10:
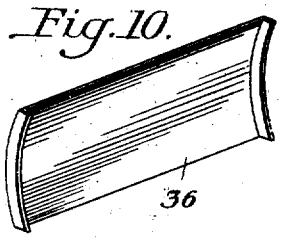
Figure 10 is a perspective view of the film guide.

The camera, as illustrated in Figures 3, 4, 5 and 6, comprises a body portion 13 having an aperture 14 closed by a shutter 15. The shutter 15, carried on a rod 16 which is slidably guided in a block 17, is normally urged upwardly by a tension spring 18. When the shutter 15 is in its lower or closed position, upward movement is prevented by a trip lever 19 which engages the upper end of the rod 16. If desired, the shutter 15 may be positively locked in closed position independently of the operating mechanism by a manually operable safety latch 15[a]. From the foregoing, it will be obvious that, with the safety latch 15[a] inoperative, the aperture 14 may be opened by disengaging the trip lever 19 from the end of the shutter rod 16, whereby the tension spring 18 becomes effective for raising the shutter 15. Disengaging of the trip lever 19 from the shutter rod 16 is effected by means of a solenoid 20, having an armature 23, mounted on the body portion 13 at the back of the camera, as shown in Figures 4 and 6, and operatively connected to the trip lever 19 through a bar 21 and a lever 22.

Figure 7:
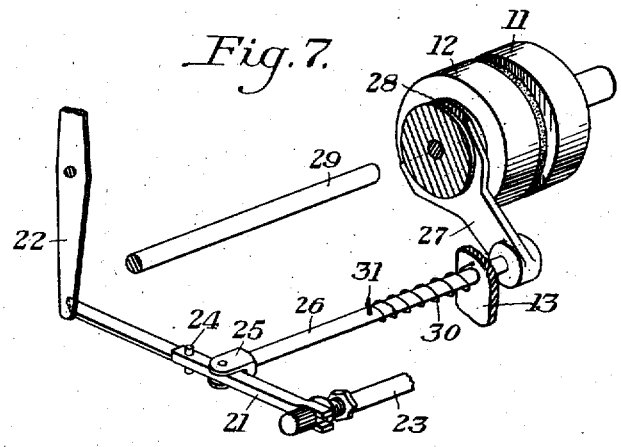
Figure 7 is a perspective view showing parts of the clutch operating mechanism.

In order that the film may be started moving coincidently with the opening of the aperture 14, the clutch disk 12 is moved into engagement with its cooperating clutch disk 11 by means of a connection to the bar 21, whereby the solenoid 20 is made effective for simultaneously opening the shutter and starting the film. For a better understanding of this mechanism, reference may be had to Figure 7, wherein there is shown the armature 23 connected with the bar 21 which has a pivot point 24. Intermediate the pivot point 24 and the armature connection is a yoke 25 which engages the bar 21 and is effective for moving a rod 26 which controls the movement of a fork 27. The fork 27 engages the clutch disk 12 in an annular groove 28 on the side thereof. The clutch disk 12 is carried on a shaft 29 which extends through the camera body. The disengagement of the clutch parts is effected by means of a spring 30 engaging the side of the camera body portion 13 and a pin 31 carried in the rod 26, whereby the clutch disk 12 is normally urged away from the clutch disk 11.

As shown in Figure 3, the shaft 29 carries a gear 32 engaging with a smaller gear 33 carried on the end of the shaft of the lower film winding spool 34, the film being wound thereon from an upper film spool 35 over a guide plate 36. The film is therefore wound from the spool 35 to the spool 34 when the clutch disks 11 and 12 are engaged.

Closing of the aperture 14 is effected by a hammer 37 carried on a rod 38 and normally urged downwardly by springs 39 coiled about the rod 38. The hammer 37 which closes the shutter 15 by striking the top of the shutter rod 16, is shown in its raised or cocked position in Figure 4, being maintained in such position by a trigger 40 (Figure 8) having a body 40[a] and a reduced upper extremity 40[b] providing a step 40[c] adapted to underlie the shank of the hammer. The hammer 37 has an opening 37[a] of greater area than the cross-section of the body 40[a] of the trigger 40 and into which the trigger passes. When the parts are in the position shown in Figure 8 the extremity 40[b] of the trigger passes loosely within the opening 37[a] and the step 40[c] is in contact with the under surface of the shank of the hammer, whereby to hold the hammer against counter-clockwise rotation about the axis of the rod 38 under the action of the springs 39. The trigger 40 is pivoted at its lower extremity on a pin 40[d] indicated diagrammatically in Figure 2, the axis of which is generally parallel to the axis of the rod 38. The upper extremity of the trigger is normally urged toward the right, viewing Figures 4 and 8, by a tension spring 41 (Figure 4). Therefore, the spring 41 is normally effective for holding the trigger in the position shown in Figure 8, whereby to maintain the hammer 37 in raised or cocked position.

For moving the trigger to release the hammer 37 there is provided a lever 42 (Figure 6), pivoted at 42[a] and provided at its extremity with a hook 42[b] embracing the upper extremity 40[b] of the trigger 40. Pivoted to the opposite extremity of the lever 42 at 42[c] is a link 43 pivoted to the upper extremity of a lever 43[a] indicated diagrammatically in Figure 2, the lower extremity of the lever 43[a] being pivoted at 43[b]. Pivoted to the lever 43[a] intermediate the ends thereof is the armature 44 of a solenoid 45.

Energizing of the solenoid 45 causes attraction of the armature 44 and consequent movement thereof within the coil of the solenoid, such movement of the armature being effective through the lever 43[a], the link 43 and the lever 42 for moving the trigger 40 to release the hammer 37, permitting movement thereof under the action of the springs 39 to effect the closing of the aperture 14 as above explained. The lever 42 transmits motion to and from the trigger 40, so the tension spring 41 is made effective through the trigger 40 for retracting the armature 44 from the solenoid 45 upon return movement of the hammer 37 to cocked position and when the solenoid is deenergized.

In order that motion of the film may be stopped coincidentally with the closing of the shutter, I provide a cam 46 carried on the rod 38 and rotated with the hammer 37. Contacting with the cam 46 is a lever 47, the lower end of which is provided with a friction pad 48, the pad 48 being held adjacent the smooth surface on the side of the large driving gear 32. The lever 47 having a pivot point 49 intermediate the cam 46 and the friction pad 48, it will be evident from the drawings that downward movement of the hammer 37 will be attended by downward movement of the cam 46, whereby the lever 47 will be turned in such manner as to press the friction pad 48 against the gear 32 and stop its rotation, thereby stopping the film.

It will thus be seen that I provide a camera mechanism wherein the film is moved by a continuously rotating motor, connection between the motor and the mechanism being effected by a solenoid which simultaneously connects the film spool and the rotating motor and opens the camera shutter, and that another solenoid is provided which simultaneously stops the film and closes the camera shutter, so that the length of film exposed is controlled entirely by the two solenoids.

Figure 2:
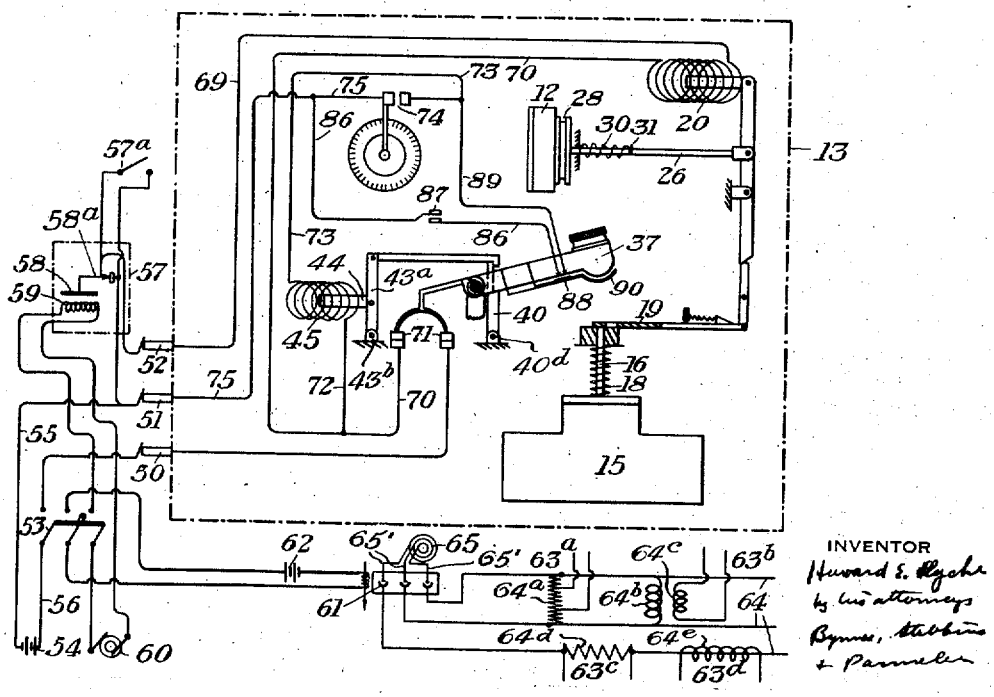
Figure 2 is a wiring diagram showing connections to the various parts of the mechanism.

Referring to the circuit diagram in Figure 2, there is shown diagrammatically, in chain line, the body portion 13 of the camera having mounted thereon contact buttons 50, 51 and 52 through which current for the operation of the solenoids 20 and 45 is supplied. The contact buttons 50 and 51 are connected with a source of current supply 54 through wires 55 and 56 and one blade of a triple pole switch 53. By means of a time relay 57, current from the wire 55 is led to the contact button 52. The time relay 57 is of the usual type in which a damped non-magnetic disk 58 is rotated by eddy currents therein set up by current flowing through a magnetic coil 59, which disk carries with it a contact arm 58[a] which upon continued rotation of the disk makes contact to connect wire 69 to the battery 54. Current is supplied to the coil 59 through the triple pole switch 53 from a suitable source 60 of alternating current. The relay 57 serves to delay the time of opening the shutter 15 until the apparatus being tested is operating under the desired test conditions. As will be seen from the drawings, the triple pole switch 53 is effective for operating a remote control switch or breaker, indicated generally at 61, by current supplied from a suitable source 62.

Thus, it will be seen that the triple pole switch 52 simultaneously operates the time relay 57, energizes the remote control switch 61, and controls the current supplied to the camera operating mechanism. The shutter opening solenoid 20 is inoperative, however, until the time relay 57 has operated to connect the contact button 52 and the wire 55. If it is desired to make an exposure substantially instantaneously as soon as the triple pole switch 53 is closed, a switch 57[a], which parallels the time relay 57, may be closed. The effect of closing the switch 57[a] is to render the triple pole switch 53 the direct control means for the shutter opening solenoid 20.

There is provided a source of current 65 from which leads 65′ pass to the remote control switch 61. Leading from the switch 61 are supply lines 64 which are adapted for connection with the apparatus being tested. If it is desired to run a test with reference to the voltage characteristics of the apparatus being tested, there may be provided a resistance 64[a] connected in shunt between two of the lines 64 and having leads 63[a] adapted for connection with the resistance 64[a] at desired adjusted positions and passing to the oscillograph vibrators 3. Alternatively, for voltage determinations there may be utilized a voltage transformer having a primary 64[b] and a secondary 64[c]. The primary is connected in shunt between two of the lines 64 and the secondary has inductive relation to the primary, as is well understood in the art. Connected with the secondary 64[c] are leads 63[b] which are for connection with the oscillograph vibrators 3. In like manner for current determinations there may be provided a resistance 64[d] in series in one of the lines 64 and with which are connected leads 63[c] adapted to pass the oscillograph vibrators. Alternatively, for current readings there may be utilized an induction coil 64[e] acting as a secondary with respect to one of the leads 64 which furnishes the primary current, leads 63[d] being connected with the coil 64[e] and being adapted for connection with the oscillograph vibrators 3. The manner of construction, connection and operation of the various devices just described is well known in the art.

Referring now to the mechanism mounted on the camera body portion wherewith the camera is controlled, it will be seen that the shutter opening solenoid 20 is supplied with current from the contact button 52 through a wire 69. The return wire 70 from the solenoid 20 leads to a switch 71 mounted on the back of the hammer 37, to the contact button 50. From the drawings, it will be evident that unless the hammer 37 is in its cocked position no current can be supplied to the shutter opening solenoid 20, thereby avoiding the waste of film which would result if the clutch were closed and the film moved when no exposure were being made. But if the hammer has been cocked, the time when the shutter is opened will be determined by the time relay 57. By this construction, I provide that the instant the hammer 37 falls, the current supply to the shutter opening solenoid 20 is cut off, whereby the spring 30 becomes effective for disengaging the clutch disk 12 from the cooperating clutch disk 11, and the driving power to the film spool is cut off.

Referring to the shutter closing solenoid 45, it will be seen that its current supply passes through a wire 72 connected to the wire 70 which is in series with the switch 71, so that the solenoid 45 is likewise inoperative unless the hammer 37 is cocked and the switch 71 closed. The return circuit through the solenoid 45 is made through a wire 73 leading to a time switch 74 from which a wire 75 leads to contact button 51. From the diagram, it will be evident that if the hammer 37 is cocked and the triple pole switch 52 is closed, the operation of the solenoid 45 will depend upon the time switch 74.

Figure 12:
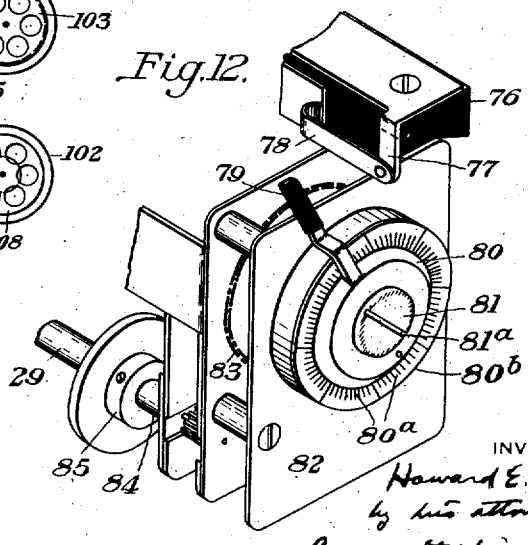
Figure 12 is a perspective view of the adjustable switch used to determine the length of film exposed.

The time switch 74, as shown in Figures 6 and 12, comprises an insulating block 76 having a contact piece 77 thereon and a spring strip 78 adapted to make contact with the contact piece 77. The strip 78 is forced against the contact piece 77 by an insulating arm 79. The arm 79 is carried on a disk 80 which is frictionally engaged by a screw head 81 having a slot 81[a]. The screw head 81 is rotated by a speed reducing mechanism 82, the head 81 being carried on an extension of the shaft for a gear 83. The speed reducing mechanism 82 is operated by the shaft 29, connection being made thereto by a shaft 84 engaging a collar 85 fastened to the shaft 29. Thus, it will be seen that the angular displacement of the arm 79 is proportional to the angular displacement of the shaft 29 and, therefore, to the length of film exposed.

The disk 80 is frictionally engaged by the head 81 with sufficient force to cause the arm 79 to close the switch 74. But the operator may manually displace the arm 79 against the friction force to any angular position desired, thereby determining the length of film exposed before the switch 74 is closed. If desired, graduations 80[a] (Figure 12) marked on a plate 80[b] back of the disk 80, may read directly in length of film exposed, thereby materially facilitating setting the arm 79.

Figure 8:
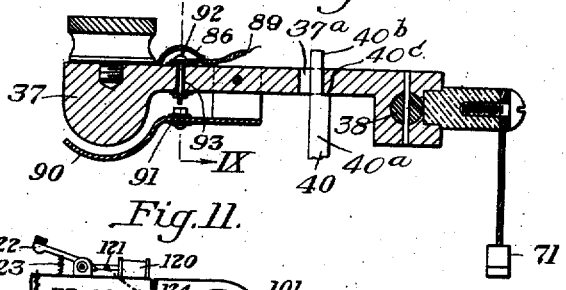
Figure 8 is a sectional view of the shutter closing hammer.
Figure 9:
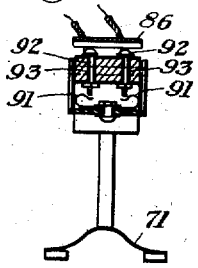
Figure 9 is a cross section on the line IX—IX of Figure 8.

Inasmuch as the screw head 81 is geared to the shaft 29, the angular displacement of the head bears a definite relation to the amount of film used, and hence the position of the slot 81[a] may be used as an indication of the length of film remaining to be exposed. It is obvious that any other suitable mark or guide could be employed. In calibrating the current and voltage waves, it is not necessary that a large amount of film be used, but merely enough to obtain a record of a complete oscillation of the vibrators or Duddell elements. For this reason, it is desirable to have some means whereby a short exposure may be had. Referring to Figure 2, it will be seen that the time switch 74 is paralleled by a line 86 containing a push button 87 in series with a switch 88 on the hammer 37, return from the switch 88 being completed by a line 89 connected to the wire 73. From the diagram, it will be obvious that if the switch 88 were closed, pressing the push button 87 would have the same effect as closing the time switch 74, the effect being that the solenoid 45 is energized and the hammer 37 is permitted to fall. As shown in Figures 8 and 9, the switch 88 consists of a strap 90 pinned to the hammer 37 and carrying spring contacts 91, which are effective for closing the circuit across contact pins 92, the contact pins extending through the hammer 37 in insulating bushings 93 to the top of the hammer 37 where they make connection with the lead wires 86 and 89. The switch 88 is closed by the shutter rod 16 when the shutter 15 is in open or raised position. Using this construction, having switches 57[a] and 53 closed, it is possible to obtain an instantaneous exposure by simply closing the push button 87, for the instant the shutter 15 is raised the shutter rod 16 will strike the strap 90, closing the switch 88 and completing the circuit through the shutter closing solenoid 45, whereby the hammer 37 is permitted to fall and close the shutter 15 in the shortest possible time. In this way, a portion of film just long enough for calibration is used, and no film is wasted.

It will be obvious that the camera operating mechanism which I have described may be applied to any type of camera body, but for oscillograph work I prefer the type of body disclosed herein. As shown in Figure 4, the front and back of the body portion are hinged at the bottom corners 94 and 95 so the camera may be readily opened up for adjustment and inserting film. The lower film spool, when full, may be withdrawn from the body portion through an opening normally closed by a screw cap 96. As stated before, the camera body portion is preferably arranged to rest upon guides 9 mounted on the body portion 2 of the oscillograph. In order that the optical alignment between the camera and the oscillograph may not be destroyed each time the camera is removed from the guides 9, I provide cooperating guides 97 in the camera body portion adapted to cooperate with the guides 9 and firmly retain the camera body portion thereon. I further provide a set screw 98 (Figure 3) adapted to abut the end of one of the guides 9, thereby determining the position of the camera 4 relative to the oscillograph body 2. Locking the set screw 98 by a nut 99 not only provides the same optical adjustment at all times, but also insures that the clutch adjustment shall always be the same, that is, the friction clutch 12 must always move to the same distance to engage the relatively fixed clutch disk 11, which latter is attached to the motor 10.

Figure 11:
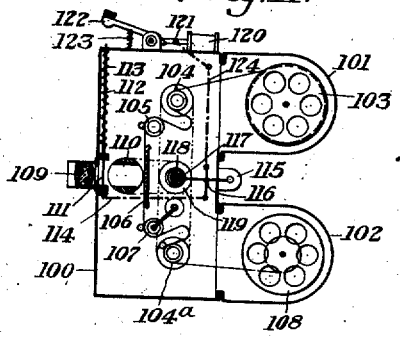
Figure 11 is a diagrammatic view of a moving picture camera embodying my invention.

In Figure 11 there is shown diagrammatically a moving picture camera having a body portion 100 fitted with film spool holders 101 and 102. The film is led from the upper film spool 103 across a sprocket 104, an intermediate sprocket 105, through an aperture plate 106. The film is drawn across the aperture plate 106 by an intermittent sprocket 107 from which it is led by a guide sprocket 104[a] to the lower film spool 108. A focusing lens 109 is provided in front of the camera body 100, and intermediate the lens 109 and the aperture plate 106 is interposed the usual rotary shutter 110.

In applying my invention to this camera, I provide an auxiliary shutter 111 interposed between the lens 109 and the rotary shutter 110. The shutter 111 is carried on a rod 112 about which is coiled a tension spring 113 which normally urges the shutter upwardly. I provide that the shutter 111 shall be retained in its lower or closed position by a trip rod 114 which is controlled by a solenoid 115 mounted on the back of the camera body portion 100, as diagrammatically indicated in the drawings. The solenoid 115 is also made effective for starting the film winding mechanism by a connection 116 between the solenoid 115 and a clutch 117 mounted adjacent a drive shaft 118. As shown in the drawings, the clutch 117 is attached to a sprocket 119 from which all of the film winding mechanism in the camera is driven. It will thus be seen that the drive shaft 118 may rotate continuously and the film winding mechanism will not be affected by such rotation until the clutch 117 is operated by the solenoid 115 to effect connection between the shaft 118 and the main driving sprocket 119. Thus, the solenoid 115 is effected for opening the shutter 111 and starting the film moving simultaneously with such opening.

On top of the camera body portion 100 I provide a solenoid 120 effective for operating a trigger 121, which latter is operatively connected to a hammer 122. The hammer 122 is normally urged in a downward direction by a tension spring 123, but is maintained in a raised or cocked position by the trigger 121.

In a manner similar to the operation of the oscillograph camera, the motion picture camera is operated by energizing the solenoid 115, whereupon the clutch 117 engages the drive shaft 118 and the main driving sprocket 119 is rotated, thereby driving the film winding mechanism. Simultaneous with this operation, the trip lever 114 is moved, whereby the shutter 111 is released, the tension spring 113 immediately snapping the shutter 111 upwardly. When the desired exposure has been made, the solenoid 120 is energized through any suitable source of current (not shown), whereupon the trigger 121 is released and the spring 123 becomes effective for striking the hammer 122 against the shutter rod 112, thereby closing the shutter and stopping exposure. Simultaneous with this operation the clutch 117 is released by means of a suitable connection 124 operatively connected between the clutch 117 and the armature of the solenoid 120.

I thus provide a mechanism for cameras using a moving film, whereby the film is started moving coincidently with the opening of the camera shutter.

I further provide means whereby the film is stopped coincidently with the closing of the shutter. It will thus be seen that no film is wasted through non-exposure.

Further advantages arise from the provision of a camera operating mechansm wherein the length of film exposed may be controlled remotely from the camera. As applied to an oscillograph camera, I preferably provide that the current supplied to the camera operating mechanism is controlled by a time relay, the relay being started at the time the apparatus being tested is supplied with current, whereby all guess work on the part of the operator is eliminated.

I further provide that the exposure may be automatically stopped after a predetermined film length has passed. Means for making an instantaneous exposure is also provided.

While I have illustrated the preferred embodiment of my invention, it will be understood that it is not limited thereto, but may be otherwise embodied within the scope of the following claims.

I claim:

1. In an operating mechanism for a camera having a shutter and using a film spool, continuously rotating driving means, electrically operated means for opening the shutter and simultaneously connecting the film spool with the driving means, and electrically operated means for closing the shutter and simultaneously disengaging the film spool from the driving means, substantially as described.

2. In a camera operating mechanism, a film spool, a continuously rotating driving motor, a magnetically operated clutch for connecting the film spool to the driving motor, a spring operated shutter released by the clutch operating mechanism whereby opening of the shutter to expose the film is coincident with the starting of the film spool, a spring operated shutter closing hammer, magnetically operated means permitting the hammer to close the shutter, and a switch connected with the magnetically operated means controlling the hammer, whereby the hammer is permitted to close the shutter after a predetermined length of film has been exposed, substantially as described.

3. The combination with a camera having a shutter and using a moving film, of means, actuated by the shutter, controlling the movement of the film, substantially as described.

4. The combination with a camera having a shutter and using a moving film, of a film spool, a continuously rotating driving motor, a magnetically operated clutch for connecting the film spool to the driving motor, a spring operated shutter released by the clutch operating mechanism whereby opening of the shutter is coincident with the starting of the film spool, a spring operated shutter closing hammer, magnetically operated means permitting the hammer to close the shutter, and a circuit closer connected with the magnetically operated means controlling the hammer, whereby the hammer is permitted to close the shutter after a predetermined length of film has been exposed, substantially as described.

5. The combination with a camera using a moving film, of a film spool, a continuously rotating driving motor, a magnetically operated clutch for connecting the film spool with the driving motor, a spring operated shutter released by the clutch operating mechanism whereby opening of the shutter is coincident with the starting of the film spool, a spring operated shutter closing hammer, magnetically operated means permitting the hammer to close the shutter, means for disengaging the film spool from the driving motor coincident with the closing of the shutter, and a circuit closer connected with the magnetically operated means controlling the hammer, whereby the hammer is permitted to close the shutter after a predetermined length of film has been exposed, substantially as described.

6. The combination with a camera using a moving film, of a film spool, a continuously rotating driving motor, a magnetically operated clutch for connecting the film spool to the driving motor, a spring operated shutter released by the clutch operating mechanism whereby opening of the shutter to expose the film is coincident with the starting of the film spool, a spring operated shutter closing hammer, magnetically operated means permitting the hammer to close the shutter, means for disengaging the film spool from the driving motor coincident with the closing of the shutter, means operable with the shutter closing hammer for stopping the film spool coincident with the closing of the shutter, and a circuit closer for permitting such shutter closing after a predetermined length of film has been exposed, substantially as described.

7. Camera operating mechanism comprising a film spool, a continuously rotating driving motor, a magnetically operated clutch for connecting the film spool to the driving motor, a spring operated shutter tripped by the clutch operating mechanism whereby opening of the shutter to expose the film is coincident with the starting of the film spool, a shutter closing hammer, magnetically operated means permitting the hammer to close the shutter, a circuit closer for permitting such shutter closing after a predetermined length of film has been exposed, and manually operated means whereby a substantially instantaneous exposure may be had, substantially as described.

8. Camera operating mechanism comprising a camera having a shutter and electrically controlled closing means therefor, a source of electrical energy, a switch normally closed by the shutter in its open position, the said switch being in series with the source of electrical energy and the electrically controlled shutter closing means, and a manually operated switch normally open in series with the last mentioned switch, whereby the latter may be made effective for connecting the source of electrical energy and the electrically controlled shutter closing means, substantially as described.

9. The combination of a camera having a shutter, electrically controlled closing means therefor, means for exposing a relatively short length of film comprising a switch held closed by the shutter in its open position, the said switch being adapted to connect a current source to the electrically controlled shutter closing means, and a manually operated switch in series with the last mentioned switch whereby the circuit to the shutter operating switch and the electrically controlled shutter closing means may be made complete, substantially as described.

10. The combination with means for testing electrical apparatus having an electrically controlled camera operating mechanism with a source of electrical energy therefor, of a source of current supply, means whereby the electrical apparatus being tested is connected to the source of current supply, switching means whereby the camera operating mechanism is connected to its source of electrical energy, the said switching means being adapted to connect the camera operating mechanism with its source of electrical energy after a predetermined time interval, substantially as described.

11. The combination with means for testing electrical apparatus, of switching means controlling the supply of electrical current to the apparatus, and control means for the testing means effective for setting the testing means in operation after the lapse of a time interval from the time the control means is actuated, said switching means being also effective for setting in operation the control means for the testing means simultaneously with supplying electric current to the device being tested, substantially as described.

12. The combination with an electrical device to be tested, of testing means having an electrically controlled camera, camera control means effective for setting the camera in operation after the lapse of a time interval from the time the electrical device is set in operation, and switching means for controlling the supply of electric current to the electrical device, said switching means being also effective for setting the camera control means in operation simultaneously with setting the electrical device in operation, substantially as described.

13. The combination with means for testing electrical apparatus, having an electrically controlled camera operating mechanism, of a source of electrical energy for the camera operating mechanism, a circuit closer effective for controlling the flow of current to the electrical apparatus being tested, said circuit closer being remotely controlled, a source of current supply for said circuit closer, a relay for connecting the source of electrical energy to the camera operating mechanism, and a switch for connecting the source of electrical energy to the camera operating mechanism, said switch being also effective for connecting the circuit closer with its source of current supply, thereby acting as a remote control therefor, and also being effective for operating the relay, substantially as described.

14. The combination with means for testing electrical apparatus, having an indicator, a camera for recording variations thereof, and an electrically controlled camera operating mechanism, of a source of electrical energy for the camera operating mechanism, a circuit closer for controlling the flow of current to the electrical apparatus being tested, said circuit closer being remotely controlled, means operatively connecting the indicator to the apparatus being tested, whereby the indicator is responsive to variations in the operation of the apparatus being tested, a source of current supply for the circuit closer, a relay for connecting the source of electrical energy to the camera operating mechanism, a source of current supply for the relay, and a switch for connecting the source of electrical energy to the camera operating mechanism, said switch being also effective for connecting the circuit closer with its source of current supply, thereby acting as a remote control therefor, and also being effective for connecting the relay to its source of current, substantially as described.

15. In an operating mechanism for a camera having a shutter and using a film spool, continuously rotating driving means, and electrically operated means for opening the shutter and simultaneously connecting the film spool with the driving means and for closing the shutter and simultaneously disengaging the film spool from the driving means.

HOWARD E. DYCHE.